United States Patent [19]

Sauer

[11] 4,034,054

[45] July 5, 1977

[54] PROCESS FOR THERMOFORMING HOLLOW ARTICLES

[75] Inventor: Donald G. Sauer, Harwinton, Conn.

[73] Assignee: National Can Corporation, Chicago, Ill.

[22] Filed: Sept. 20, 1974

[21] Appl. No.: 507,788

[52] U.S. Cl. .............................. 264/93; 264/313; 264/322

[51] Int. Cl.² ................... B29C 17/04; B29F 5/00

[58] Field of Search ............ 264/316, 87, 93, 322, 264/313, 292

[56] References Cited

UNITED STATES PATENTS

| | | | |
|---|---|---|---|
| 2,468,697 | 4/1949 | Wiley | 264/93 |
| 2,648,099 | 8/1953 | Dunmire | 264/93 |
| 2,962,757 | 12/1960 | Slemmons et al. | 264/93 |
| 3,342,915 | 9/1967 | Wanderer | 264/93 |
| 3,608,055 | 9/1971 | Long | 264/316 |

*Primary Examiner*—Willard E. Hoag
*Attorney, Agent, or Firm*—Marn & Jangarathis

[57] ABSTRACT

There is disclosed a novel process for using a pressure box assembly associated with a thermoplastic thermoforming assembly. The pressure box assembly is provided with a diaphram formed of a resilient material, such as synthetic rubber and the like, disposed across the entrance into a cavity of the pressure box of the pressure box assembly.

The pressure box assembly is associated with thermoforming molding apparatus to cause a heat thermoplastic sheet or web to be drawn about a male mold provided on a male mold assembly during insertion of the male mold into the cavity in a hollow article of more uniform wall thickness.

1 Claim, 4 Drawing Figures

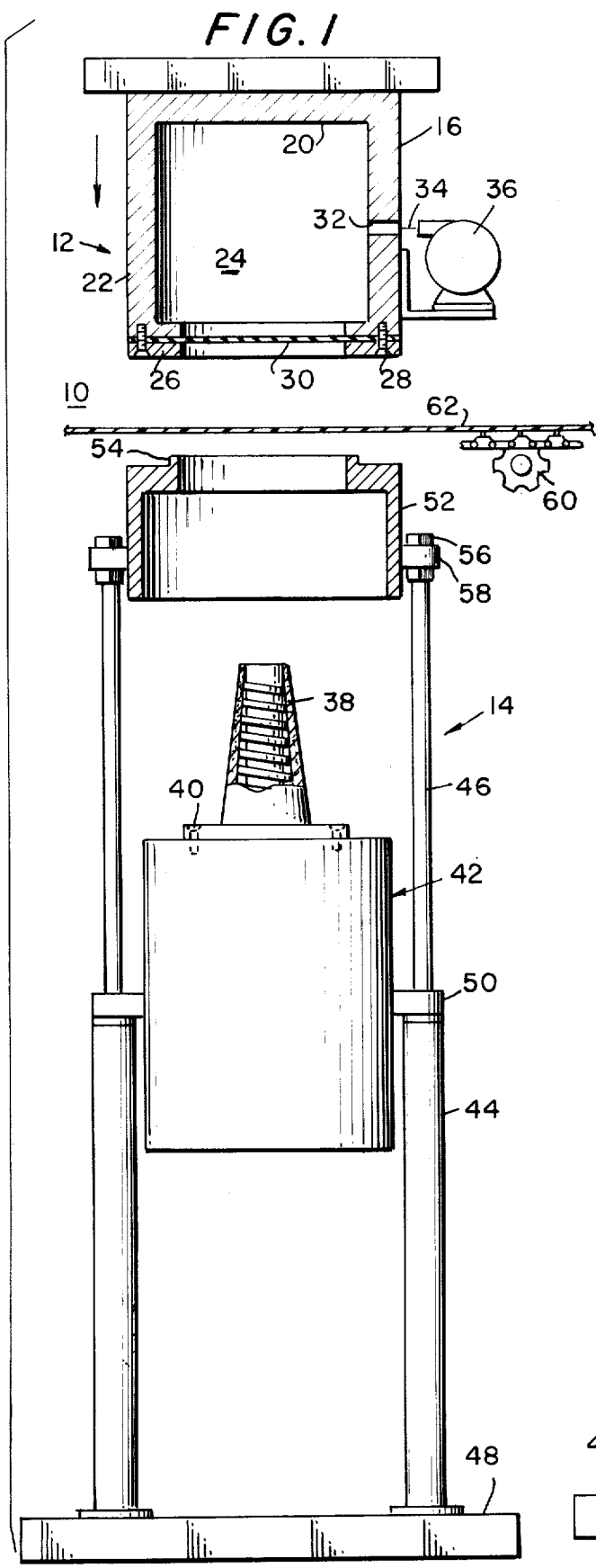
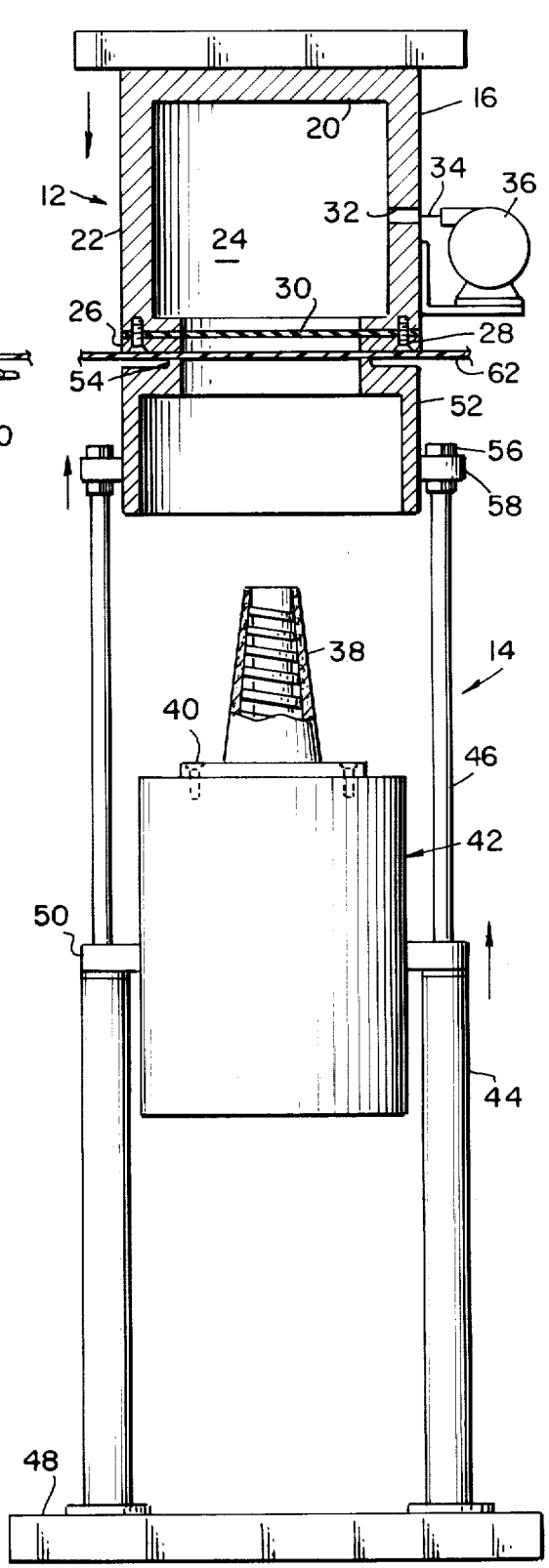

PROCESS FOR THERMOFORMING HOLLOW ARTICLES

FIELD OF THE INVENTION

This invention relates to a process and apparatus for molding hollow plastic articles from a sheet or strip of thermoplastic material, and more particularly to a novel pressure box assembly and process and apparatus for the thermoforming of hollow plastic articles utilizing such assembly. This application relates to co-pending application U.S. Ser. No. 506,333, filed Sept. 16, 1974 and assigned to the same assignee as the present invention.

BACKGROUND OF THE INVENTION

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The former may be exemplified by the application of pressure within a pressure box produced by compressed air or the like, to press the softened material against the contours of a male mold or core pin. Alternately, a vacuum may be applied from within a female mold while allowing atmospheric pressure to shape the heat softened thermoplastic material against the surface of the female mold. For many purposes, a combination of these two techniques is preferred with the softened sheet material being subjected to vacuum on the face as such combination provides greater versatility and better control in the forming operation.

Recently, a process has been advanced utilizing a preformed liner which produces a barrier container, i.e., a semi-rigid plastic container provided with a liner or inner layer of another material or materials having properties different than the outer layer thereof. In accordance with such process, the preformed liner or sleeve (manufactured, for example, by thermoforming techniques) is positioned over a core rod with a parison being subsequently formed about the liner in an injection station of an injection blow molding machine. The lined or composite parison is expanded in a blow molding station of the machine with the resulting lined container being removed from the core rod in a product receiving station. As a result of the creasing tendency of the liner during the formation of the preform due to orientation and/or size variations of the thermoformed liner, many barrier containers are formed which have poorly fitted liners.

OBJECTS OF THE INVENTION

An object of the present invention is to provide an improved process and apparatus for thermoforming hollow plastic articles which overcome the problems of the prior art.

Still another object of the present invention is to provide an improved process and apparatus for forming hollow plastic articles whereby creasing of the liner of a barrier container is substantially eliminated.

Another object of the present invention is to provide a novel pressure box assembly for a thermoforming process and apparatus.

Various other objects and advantages of the present invention will become apparent from the following detailed description of an exemplary embodiment thereof with the novel features thereof being particularly pointed out in the appended claims.

SUMMARY OF THE INVENTION

In accordance with one embodiment of the present invention, there is provided a pressure box assembly provided with a diaphram formed of a resilient material, such as synthetic rubber and the like, disposed across the entrance into a cavity of the pressure box of the pressure box assembly, as more fully hereinafter described.

Another embodiment of the present invention is directed to the use of the hereinabove described pressure box assembly in a process and apparatus for thermoforming hollow articles, and in particular, such use for the production of liners of more uniform thickness to be used in the subsequent manufacture of barrier containers. Accordingly, such a pressure box assembly is associated with thermoforming molding apparatus to cause the thermoplastic sheet or web to be drawn about a male mold provided on a male mold assembly during the formation of the hollow article. In this manner, the hollow article, e.g., a liner, is formed with more uniform wall thickness.

BRIEF DESCRIPTION OF THE DRAWINGS

The invention will be more clearly understood by reference to the following detailed dscription of an exemplary embodiment thereof in conjunction with the accompanying drawings wherein like reference numerals designate like parts in all figures in which:

FIG. 1 is a vertical view, partially in section, of a thermoforming molding machine embodying the principles of the present invention with some accessories omitted for greater clarity; and FIGS. 2 to 4 are schematic vertical side sections of the thermoforming machine of FIG. 1 sequentially illustrating the formation of a hollow article.

DETAILED DESCRIPTION OF THE DRAWINGS

Figure 3:
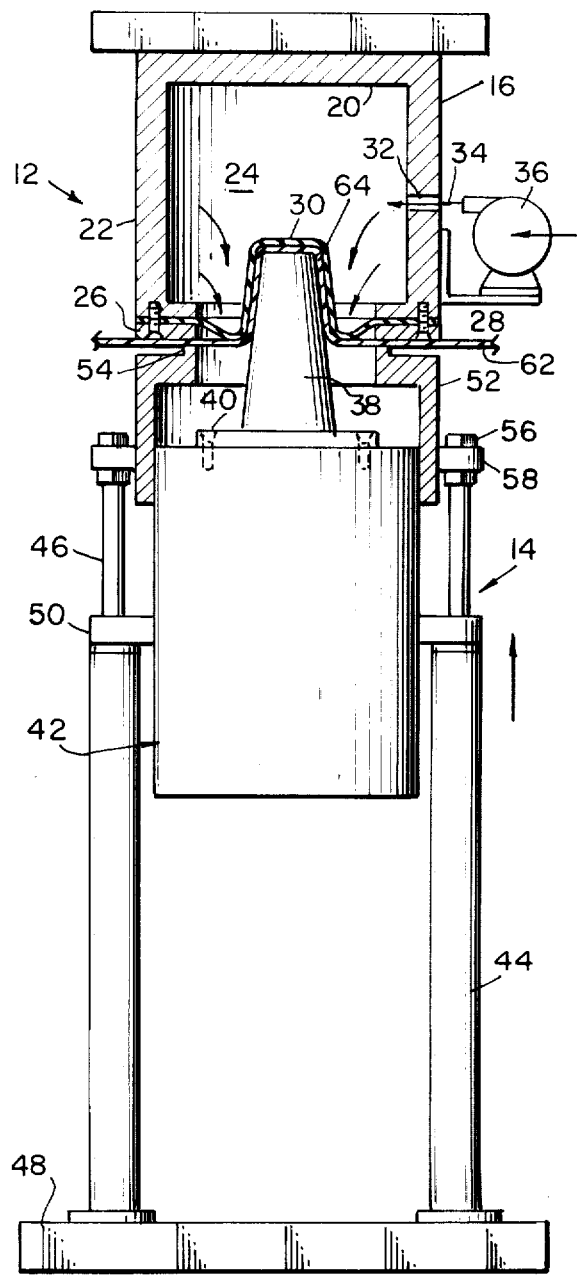

It will be appreciated that the type of thermoplastic or thermoelastically deformable material employed in the present process is generally determined by the economics and duty to which the hollow article will eventually be placed. Among the many thermoplastic resins suitable for various purposes and adaptable to thermoforming are high-impact polystyrene, polybutadiene, styrene-butadiene blends or copolymers, polyvinylchloride and related vinyl polymers, polyallomers, nylon, formadehyde polymers, polyethylene, polypropylene, nitrocellulose, cellulose acetate, cellulose propionate, cellulose acetate butyrate, polymethylmethacrylate, ethyl cellulose, benzyl cellulose and esteresters of cellulose.

Referring now to FIG. 1 a portion of a molding machine, generally indicated as 10, such as that manufactured by the Brown Machine Co. of Beavertown, Mich., is shown with a pressure box assembly, generally indicated as 12, and a male mold assembly, generally indicated as 14. While the particular disposition of apparatus elements depicted in FIG. 1 does not correspond with any stage of the actual forming cycle, this view illustrates the construction and arrangement of various parts of the equipment. The pressure box assembly 12 includes a pressure box 16 which is rigidly attached to an upper platen 18 and which may be provided with passageways (not shown) to permit the circulation of a heat transfer medium to cool, heat or maintain a constant temperature in the pressure box 16. The pressure box assembly 12 is constructed and arranged for vertical movement in the molding machine by suitable mechanism (not shown) as known to those skilled in the art.

The pressure box 16 is formed with a top wall 20 and side walls 22 defining a main cavity 24 of the pressure box 16. The pressure box 16 is provided with a clamping grid 26 rigidly mounted to the pressure box, such as by bolts 28, a flexible diaphram 30 across the entrance to the cavity 24. The flexible diaphram is formed of a resilient material, such as natural or synthetic rubber or the like of a thickness to cause the thremoplastic material to be drawn about the male mold, generally a thickness of from 1/16 to 3/32. It will be apparent to one skilled in the art that the resilient material must be carefully selected to accomplish the desired purpose with minimal turn around requirements. A side wall 22 of the pressure box 16 is provided with an orifice 32 to permit the introduction of a compressed fluid into the cavity 24 of the pressure box 16 by placing the orifice 32 in fluid communication by line 34 with the compression side of a pump, generally indicated as 36.

The male mold assembly 14 is comprised of a male mold 38 mounted, such as by screws 40, to a male mold support assembly, generally indicated as 42. The male mold 38 may be formed of a porous material (i.e., having a multiplicity of discrete passageways formed during the fabrication thereof), such as (2) micron stainless steel, such as disclosed in co-pending application U.S. Ser. No. 506,333, filed Sept. 16, 1974 assigned to the same assignee as the present invention. The male mold support assembly 42 may be provided with passageways not shown for the passage of an intermediate heat transfer fluid.

The male mold assembly 14 is provided with fluid cylinders 44 including piston rods 46 mounted on a lower platen 48. The male mold support assembly 42 is positioned about the upper ends of the fluid cylinders 44 by mounting brackets 50 formed on the side walls of the male mold support assembly 42. A clamp support assembly 52 including a clamp grid 54 is mounted, such as by bolts 56, to the ends of the piston rods 46, such as by brackets 58, formed on the clamp support assembly 52.

In FIG. 1 there is also illustrated a feed mechanism, generally indicated as 60, for advancing the thermoplastic web or sheet 62, after being heated to a softened state by suitable means (not shown), such as radiant heaters, infrared lamps, etc. The following description in conjuction with FIGS. 1 to 4 illustrates the sequence of steps in the formation of a hollow article in accordance with the present invention. As is known to those skilled in the art, the pressure box assembly 12, at the beginning of a cycle, is positioned (not shown) above the thermoplastic sheet a distance sufficient to permit the subsequent unimpeded horizontal passage of the formed article upon advancement of the thermoplastic sheet 62 by the mechansim 64.

The strip of thermoplastic sheet 62 softened to an optimum forming termperature (i.e., to a stretchable plastic condition) is advanced by the feed mechanism 60 into position between the upper and lower assemblies 12 and 14. The upper platen 16 is caused to be moved downwardly to the point at which the clamp grid 26 is proximate to the sheet 62 with the lower platen 48 being raised to the position shown in FIG. 2 whereby the clamp grid 54 is pressed against the lower surface of the sheet 62 thus trapping the sheet or web of thermoplastic material around the entrance to the cavity 24 of the pressure box 16 between the grids 26 and 54. Positive pressure is continuously maintained on the fluid cylinders 44 to retain the grip about the grids 26 and 54 on the plastic sheet 68 during the remainder of the forming operation.

The male mold 38 is caused to be moved through the original plane of the sheet of thermoplastic material 62 by the continued upward movement of the lower platen 48 thereby stretching and drawing the material through the resilent diaphram 30 and into the cavity 24 of the pressure box to control the wall thickness and uniformity of the wall thickness of the shaped article. During initial upward movement of the male mold 38 through the resilient material 30, the cavity 24 is placed under a positive pressure by placing the cavity 24 in fluid communication with the compression side of the pump 36 by orifice 32 via line 46 to control the wall thickness and uniformity of wall thickness of the shaped article.

Figure 4:
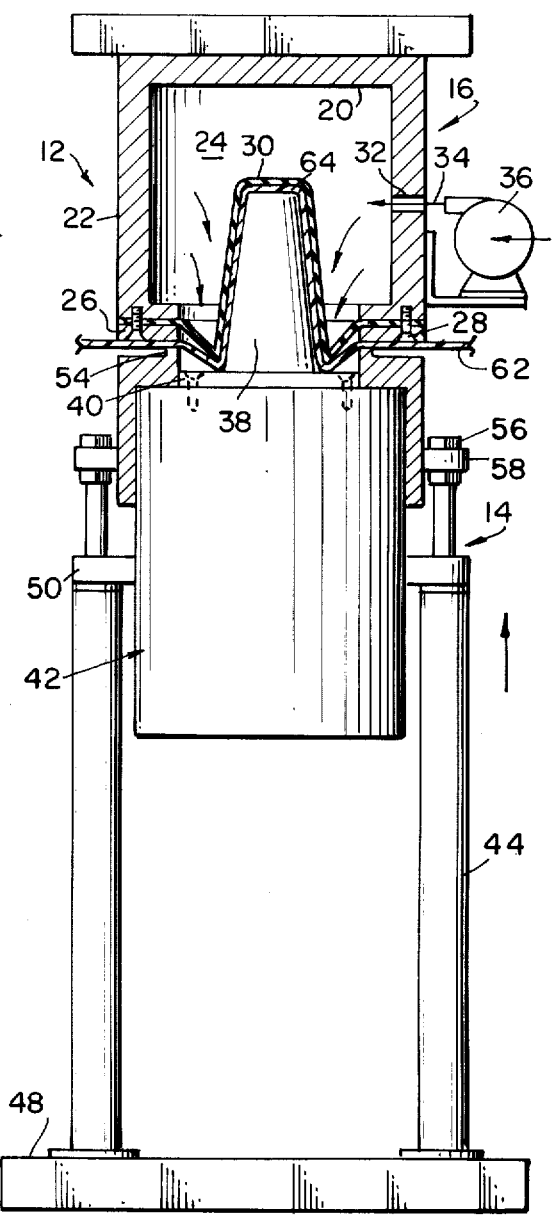

Upward movement of the lower platen 48 is continued until the male mold support assembly 42 is fully disposed within the clamping support member 52, as illustrated in FIG. 4, thereby arresting further upward movement of the male mold support assembly 38. The flow of compressed fluid into the cavity 24 is discontinued and the pressure box assembly 12 is thereafter caused to be moved vertically upwardly to an initial position to a point when the formed hollow article 64 may readily pass during subsequent advancement of the thermoplastic sheet 62 by the drive means 60. The male mold assembly is caused to be downwardly displaced to the position illustrated in FIG. 1. The feed mechanism 62 is actuated to move the section of web 64 having the shaped article 66 projecting thereabove out of the machine 10 (not shown), and to position a fresh section of heated plastic sheet between the mold assemblies 12 and 14 in preparation for the next molding cycle. The shaped article 66 is trimmed with the excess material being usually returned to an extruder or other auxiliary equipment for re-use in the preparation of the thermoplastic sheet from which the article is formed. Hollow articles formed in accordance with the present invention may be conveyed to a liner feeder apparatus, such as disclosed in copending application Ser. No. 448,191 filed Mar. 5, 1974, and assigned to the same assignee as the present invention.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. In a process for thermoforming a hollow plastic article from a sheet of heated thermoplastic material over a male mold contained to a desired internal shape of said article, wherein said sheet of thermoplastic material is firmly held between a pressure box assembly and a male mold assembly including said male mold, the improvement comprising:

a. closing an entrance to a chamber of said pressure box by disposing a resilient diaphragm of elastomeric material across said entrance, between said sheet and said entrance;

b. stretching and forming said sheet by moving and pressing said male mold against a side of said sheet opposite said diaphragm, said moving including passing said male mold through a plane originally occupied by said diaphragm so that said resilient diaphragm causes said sheet to be drawn about said male mold, and maintaining chamber at a positive pressure with a compressible fluid during said stretching and forming.

* * * * *